Feb. 5, 1924.  
J. CHANDLER  
FRUIT DRIER  
Filed Oct. 26, 1922

1,482,972

Inventor,
John Chandler
by Hazard and Miller
Att'ys

Patented Feb. 5, 1924.

1,482,972

UNITED STATES PATENT OFFICE.

JOHN CHANDLER, OF CHINO, CALIFORNIA.

FRUIT DRIER.

Application filed October 26, 1922. Serial No. 597,066.

*To all whom it may concern:*

Be it known that I, JOHN CHANDLER, a citizen of the United States, residing at Chino, in the county of San Bernardino and State of California, have invented new and useful Improvements in Fruit Driers, of which the following is a specification.

This invention relates to apparatus for the drying or dehydration of fruit, and has for its object to provide an apparatus that is of simple construction and will operate effectively to dry the given charge of fruit with the proper degree of action in a comparatively short time as contrasted to the practice of drying in the open air by sun heat. Another object is to provide in the drying apparatus means for utilizing heated gases of combustion and also to utilize other heat radiating means both without bringing the substance being dried into contact with the heated gases or heated fluid and thus prevent contamination or injury to the stock.

Another object of the invention is to provide means enabling the combined action of sun heat and heat generated by combustion of fuel, this being desirable especially in countries where a considerable degree of sun heat is available.

Other objects and advantages will be made manifest in the following specification of an embodiment of the invention illustrated in the accompanying drawings, wherein—

Figure 1:
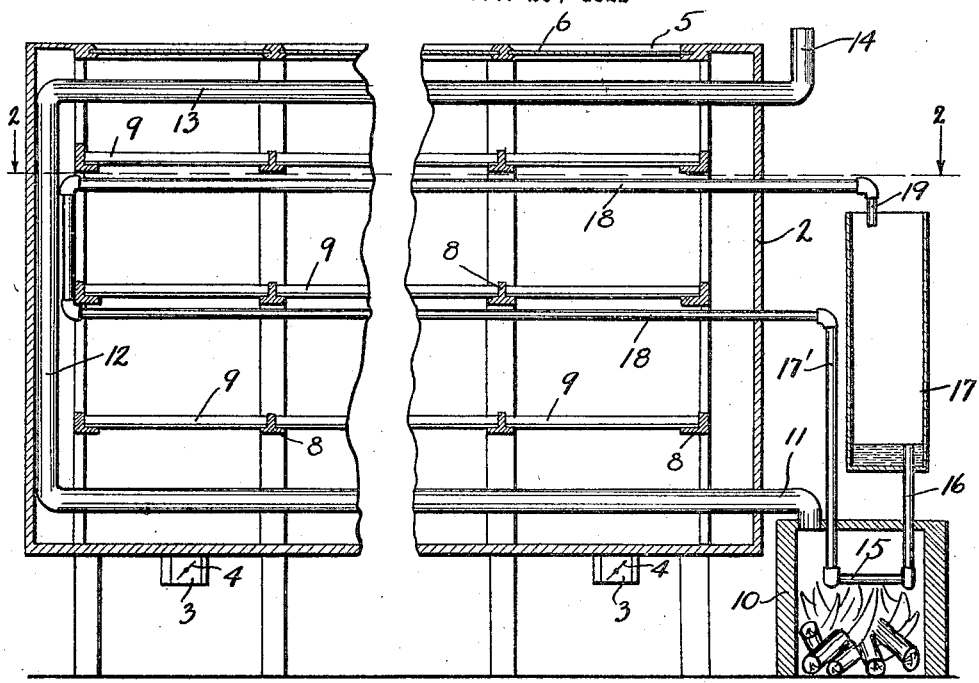
Figure 1 is a vertical longitudinal section of the apparatus.
Figure 2:
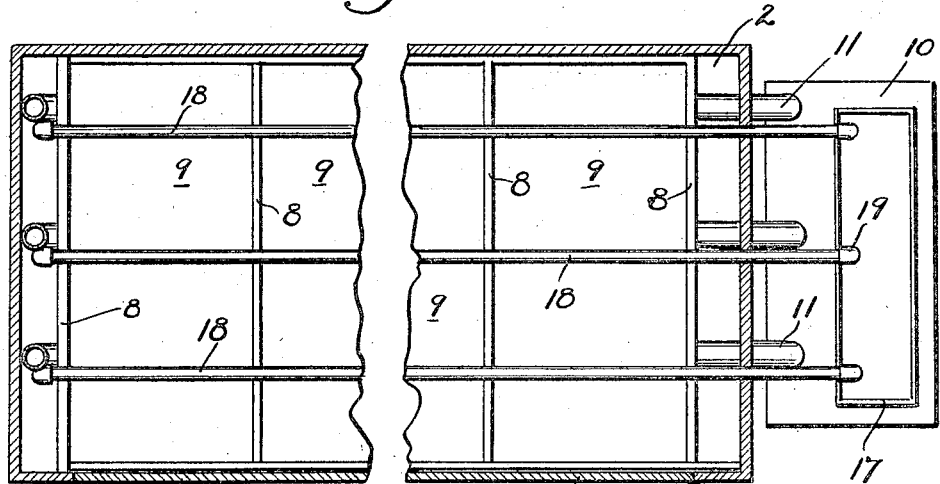
Fig. 2 is a horizontal section on the line 2—2 of Fig. 1.

In its preferred embodiment, the invention consists of a suitable compartment or house 2 of requisite dimensions as may be desired according to the quantity of fruit to be dried. The mention of drying of fruit is not intended to imply that the apparatus is limited to fruit only, as it may be utilized for the drying of nuts and other substance.

The house is preferably provided with closed side, end and bottom walls, excepting that the latter is provided with ventilating and fumigating inlets 3 in which may be provided valves 4 to regulate the flow of air or other gases which may be utilized in the treatment of the fruit, as for instance sulphurous gases.

The top 5 of the house is preferably provided with transparent windows as of glass 6 providing for the admission of sun rays into the interior of the house.

One side of the house may be provided with hingedly mounted doors 7 which, when thrown open, provide for access to the interior. In the house there are arranged transverse racks 8 which are spaced somewhat inwardly from the end walls of the house so as to provide for the upward flow of air and gas currents. Removably adjustable upon the racks 8 are trays 9 having perforated or foraminous bottoms through which heated air currents may rise to engage the fruit or other substance in trays.

To provide for the heating of the apparatus in the absence of sufficient sun heat, there is provided adjacent to one end of the housing a furnace 10 and this has hot gas outlet flues 11 which lead horizontally into the lower portion of the compartment in the house 2 and extend upwardly as at 12 in the opposite end and thence return horizontally at 13 below the top of the house and discharge at an outlet 14 which may be arranged exterior to the house.

Further means are provided for heating the compartment and this is shown as including a hot water or steam pipe system 15 having an inlet 16 leading from the bottom of the water tank 17. The heating system includes a manifold in the furnace 10 from which extends a series of upright pipes 17' which are connected to longitudinally extending pipes 18 in the house and which are arranged preferably between the uppermost and lowermost of the trays 9. There are shown two courses of horizontal steam pipes 18, the upper course having return nozzles 19 discharging into the water tank 17.

From the above it will be seen that I have provided an apparatus for utilizing sun heat for such a period of time as may be practicable and when a sufficient degree is obtainable in the apparatus to dry the substance in the trays. I have demonstrated that fruits, such as halves of peaches can be cured in about sixteen hours in the continuous operation of the apparatus, and during this period sufficient heat is obtained by combustion fuel in the furnace 10. Economy of operation is secured by the utilization of the hot gases of combustion running through the flues 11 and 13 extending in the house 2. Additional heat is secured by the steam heat system including the horizontal pipes 18. The economy of operation is further increased since the water is constantly circulated through the heating system and back into the hot water tank 17.

Further embodiment, modifications and changes may be resorted to within the spirit of the invention as here claimed.

What is claimed is:

1. A dehydrating apparatus comprising a compartment having racks upon which trays containing substance to be treated are to be arranged, a fire box, smoke flues from the fire box in parallelism through and up in the compartment, a water tank having water pipes leading to the fire box and thence parallel to and just below trays on the racks and returning to the tank.

2. A dehydrating apparatus comprising a compartment having racks upon which trays containing substance to be treated are to be arranged, a fire box outside of chamber, smoke flues from the fire box in parallelism through and up in the compartment, a water tank having water pipes leading to the fire box and thence parallel to and just below trays on the racks and returning to the tank.

In testimony whereof I have signed my name to this specification.

JOHN CHANDLER.